US010844829B2

(12) United States Patent
Ning et al.

(10) Patent No.: US 10,844,829 B2
(45) Date of Patent: Nov. 24, 2020

(54) OSCILLATING WATER COLUMN-OSCILLATING BUOY COMBINED WAVE ENERGY CONVERTER

(71) Applicant: DALIAN UNIVERSITY OF TECHNOLOGY, Dalian (CN)

(72) Inventors: Dezhi Ning, Dalian (CN); Yu Zhou, Dalian (CN); Chongwei Zhang, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 16/344,329

(22) PCT Filed: Nov. 16, 2017

(86) PCT No.: PCT/CN2017/111305
§ 371 (c)(1),
(2) Date: Apr. 23, 2019

(87) PCT Pub. No.: WO2019/090803
PCT Pub. Date: May 16, 2019

(65) Prior Publication Data
US 2020/0080536 A1   Mar. 12, 2020

(30) Foreign Application Priority Data

Nov. 8, 2017 (CN) .......................... 2017 1 1091992

(51) Int. Cl.
*F03B 13/14* (2006.01)
(52) U.S. Cl.
CPC .................................... *F03B 13/14* (2013.01)
(58) Field of Classification Search
CPC ...... F03B 13/24; F03B 13/1845; F03B 13/14; F03B 13/142; Y02E 10/32; Y02E 10/38
See application file for complete search history.

(56) References Cited

U.S. PATENT DOCUMENTS

| 2009/0121487 A1* | 5/2009 | Fraenkel | F03B 13/142 |
| | | | 290/53 |
| 2015/0266549 A1* | 9/2015 | Qu | B63B 21/50 |
| | | | 248/550 |

(Continued)

FOREIGN PATENT DOCUMENTS

| CN | 204511760 U | 7/2015 |
| CN | 106762361 A | 5/2017 |

(Continued)

*Primary Examiner* — Shafiq Mian
(74) *Attorney, Agent, or Firm* — Muncy, Geissler, Olds & Lowe, P.C.

(57) ABSTRACT

The present invention provides an oscillating water column-oscillating buoy combined wave energy converter. The present invention combines the advantages of the wave energy converters of the oscillating water column and the oscillating buoy. The conversion principles of wave energy of the oscillating water column and the oscillating buoy are on the contrary. The oscillating water column works when the structure does not move, while the oscillating buoy works when the structure substantially vibrates. The oscillating water column and the oscillating buoy are respectively operated in respective spectral ranges without affecting each other, thereby expanding the effective frequency band width of wave energy conversion. Due to the characteristic of absorbing the wave energy at all directions of 360°, the absorption efficiency of the wave energy is enhanced. Through the adoption of a fixed structure, stability of the converter can be ensured, generating efficiency is enhanced and maintenance is facilitated.

8 Claims, 2 Drawing Sheets as an illustration in Abstract

(56) References Cited

U.S. PATENT DOCUMENTS

2016/0169188 A1\* 6/2016 Dick ................. F03B 13/20
                                                                             290/53
2018/0313321 A1\* 11/2018 Nguyen ............. F03B 13/16
2019/0353139 A1\* 11/2019 Sheldon-Coulson .................
                                                                            H02K 7/1823

FOREIGN PATENT DOCUMENTS

| CN | 206206062 U | 5/2017 |
| GB | 2496856 A | 5/2013 |

\* cited by examiner

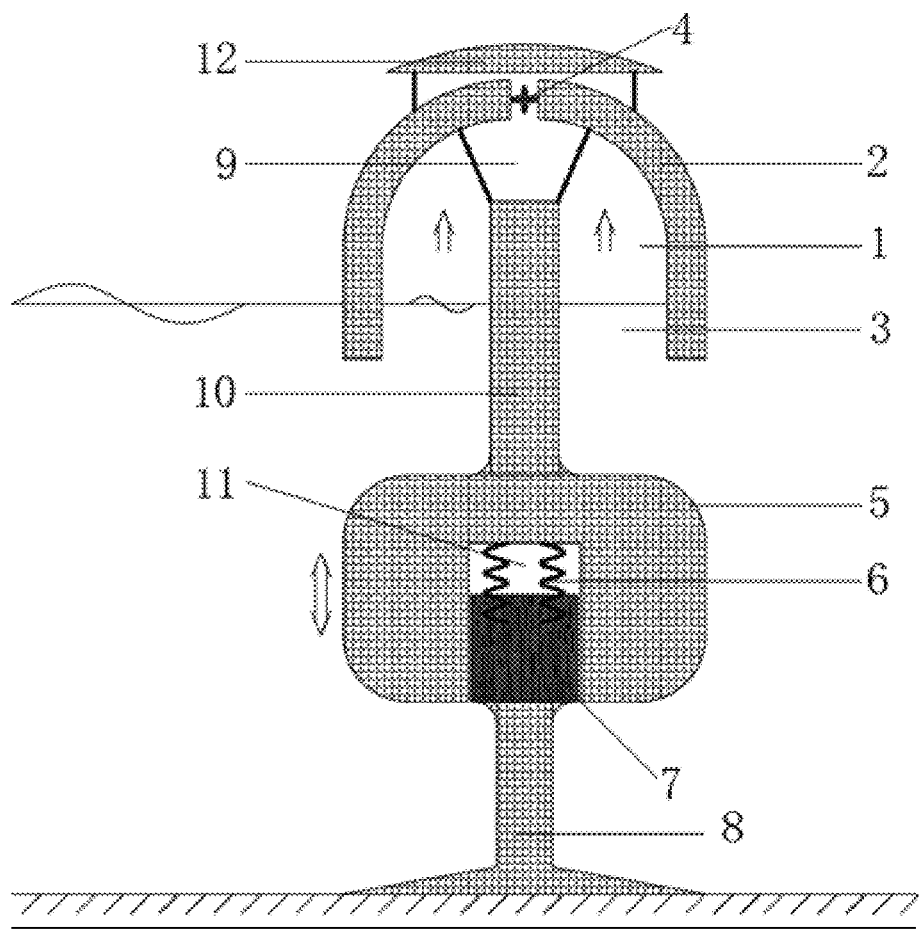
Fig.1 as an illustration in Abstract
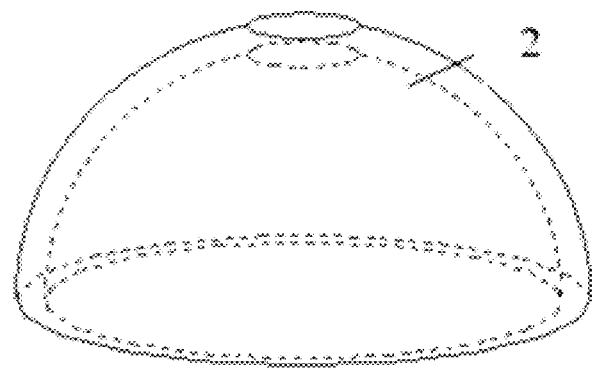
Fig. 2

OSCILLATING WATER COLUMN-OSCILLATING BUOY COMBINED WAVE ENERGY CONVERTER

TECHNICAL FIELD

The present invention relates to an oscillating water column-oscillating buoy combined wave energy converter, and belongs to the technical field of use of new energy.

BACKGROUND

In the present world, the global energy demand continues to increase, fossil fuel resources are in short supply, and the supply and demand relationship is increasingly tense. Moreover, the discharge of pollutants has caused serious environmental and climate problems. Development of renewable energy is the best choice to solve energy and environmental problems, which is also one of the common strategies adopted by all countries. Development and utilization of the renewable energy is an important measure to protect the environment and cope with climate change. Marine energy, especially wave energy, is a kind of renewable energy with good quality. At present, people have developed various wave energy converters. Because of the advantages of reliable performance and simple structure, an oscillating water column wave energy converter has been studied and constructed to the largest extent in many countries. An oscillating buoy wave energy converter is a point-absorption wave energy converter. It comes into direct contact with waves to absorb wave energy, and has high energy conversion efficiency and strong wind resistance capacity.

There are two kinds of oscillating water column wave energy converters: fixed type and floating type. The main structure is a downward-open air chamber structure, and the upper part has a air hole pipeline connected to a turbogenerator. The oscillating buoy wave energy converter is mainly composed of a dynamic buoy and a static float. The static float is combined with a damping engine for absorbing mechanical energy generated during motion. The dynamic buoy is formed by a floating body, and move in heave direction under the action of waves. Therefore, in order to realize the combination of different energy converters in functions and improve the performance price ratio of wave energy conversion, an oscillating water column-buoy wave energy converter is proposed. Its good combining form not only enhances the stability of the converter and wave energy conversion efficiency, but also makes an oscillating water column part and an oscillating buoy part effective in respective spectral ranges without affecting each other, thereby widening frequency band width of energy conversion of the converter.

SUMMARY

The purpose of the present invention is to propose an oscillating water column-oscillating buoy combined wave energy converter to increase conversion efficiency and reduce cost of the wave energy converter.

The present invention adopts the following technical solution:

An oscillating water column-oscillating buoy combined wave energy converter comprises an oscillating water column system and an oscillating buoy system; the oscillating water column system is mainly composed of a air chamber 3, a turbogenerator 4 and an inner supporting cylinder 10; the oscillating buoy system is mainly composed of an oscillating buoy 5, a damping generator 6 and a pile foundation structure 8; the oscillating water column system is connected with the oscillating buoy system through the inner supporting cylinder 10 and the oscillating buoy 5; and the pile foundation structure 8 is used to fix the entire converter to a seabed.

The air chamber 3 is a cavity composed of a cylindrical ring body 1 and a hemispherical ring body 2; the hemispherical ring body 2 is upturned on the upper end of the cylindrical ring body 1 and has the same radius as the cylindrical ring body 1; the cylindrical ring body 1 is a hollow cylinder with open top and bottom; the hemispherical ring body 2 is a hollow hemispheroid; a air hole pipeline is arranged in the center position of the top of the hemispherical ring body 2; the turbogenerator 4 is installed in the air hole pipeline; and the air hole pipeline is provided with a baffle plate 12.

The inner supporting cylinder 10 is positioned on an axis of the air chamber 3, and the top of the inner supporting cylinder 10 is connected with the hemispherical ring body 2 through a supporting truncated cone 9; the top of the supporting truncated cone 9 is attached to an inner surface of the hemispherical ring body 2 and is used for supporting the air chamber 3; the top center of the supporting truncated cone 9 is provided with a air hole pipeline which is communicated with the air hole pipeline on the hemispherical ring body 2; four cylindrical air holes which penetrate through the truncated cone are uniformly formed in the supporting truncated cone 9, and are communicated with the air hole pipeline in the top center of the supporting truncated cone 9 so that a compressed airflow enters the air hole pipeline.

The oscillating buoy 5 is a cylinder with a cavity on the bottom to produce buoyancy, and has an air cylinder 11 on the lower part; the top of the oscillating buoy 5 is fixedly connected with the bottom of the inner supporting cylinder 10; the damping generator 6 and a piston 7 are positioned in the cavity; the upper part of the damping generator 6 is connected with the inner wall of the cavity of the oscillating buoy 5, and the lower part is connected with the piston 7; and the piston 7 is fixedly connected with the pile foundation structure 8 through the air cylinder 11.

During use, the oscillating water column system and the oscillating buoy system are respectively operated in respective spectral ranges. For the oscillating water column system, the water surface, the cylindrical ring body and the hemispheroid jointly form a air chamber. Under the action of waves, the waves penetrate through the bottom of the cylindrical ring body to enter the cylindrical ring body to form a water column which oscillates up and down; and the water column vibrates up and down to compress and expand the air in the air chamber so as to push the turbogenerator repeatedly through the air hole pipeline on the top of the air chamber to rotate. At this moment, the oscillating buoy system may not greatly influence the oscillating water column system. For the oscillating buoy system, the buoy produces heaving motion under the action of the waves. Relative displacement is produced between the buoy and the piston, so as to drive the damping generator in the cavity to generate electricity.

The cylindrical ring body 1, the hemispherical ring body 2 and the air hole pipeline are made of high-strength light materials; and joints are anchored with high-strength stainless steel bolts.

The turbogenerator 4 rotates in the same direction under the action of bidirectional airflows.

The upper and the lower round edges of the oscillating buoy 5 are smoothed to reduce the horizontal force of waves on the entire converter.

The piston 7 and the air cylinder 11 are sealed with a seal ring.

The present invention has the beneficial effects: the present invention combines the advantages of the wave energy converters of the oscillating water column and the oscillating buoy. The conversion principles of wave energy of the oscillating water column and the oscillating buoy are on the contrary. The oscillating water column works when the structure does not move, while the oscillating buoy works when the structure substantially vibrates. The oscillating water column and the oscillating buoy are respectively operated in respective spectral ranges without affecting each other, thereby expanding the effective frequency band width of wave energy conversion. Based on the characteristic of absorbing the wave energy at all directions of 360°, the performance of the wave energy is enhanced. Through the adoption of a fixed structure, stability of the converter can be ensured, generating efficiency is enhanced and maintenance is facilitated. The wave energy converter adopts array arrangement, can further enhance the utilization rate of the wave energy and can also simultaneously consider the function of marine engineering protection facilities.

DESCRIPTION OF DRAWINGS

FIG. 1 is a structural schematic diagram of an oscillating water column-buoy wave energy converter of the present invention.

FIG. 2 is a structural schematic diagram of a hemispherical ring body.

Figure 3:
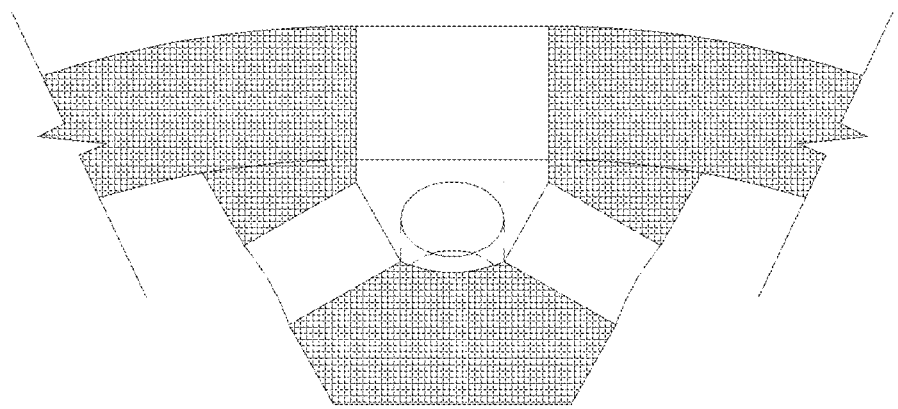
FIG. 3 is a sectional schematic diagram of a supporting truncated cone.
Figure 4:
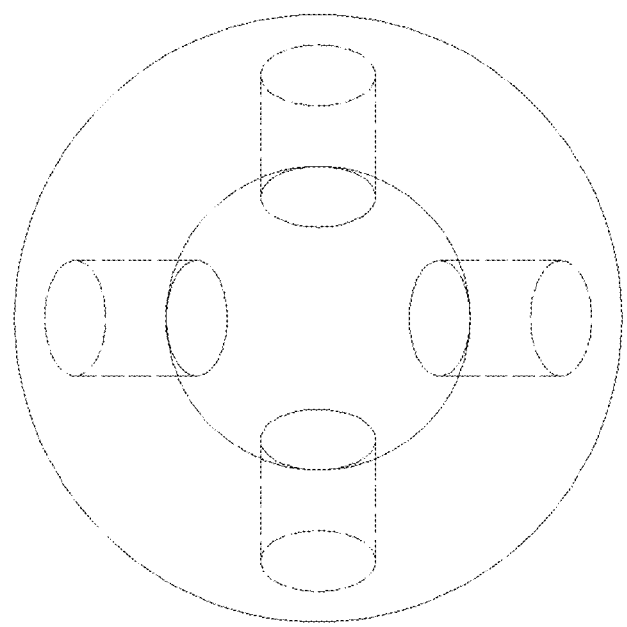
FIG. 4 is a top view of a supporting truncated cone.

In the figures: 1 cylindrical ring body; 2 hemispherical ring body; 3 air chamber; 4 turbogenerator; 5 oscillating buoy;

6 damping generator; 7 piston; 8 pile foundation structure; 9 supporting truncated cone; 10 inner supporting cylinder; 11 air cylinder; and 12 baffle plate.

DETAILED DESCRIPTION

Specific embodiments of the present invention are further described below in combination with accompanying drawings and the technical solution.

As shown in FIG. 1, an oscillating water column-oscillating buoy combined wave energy converter comprises an oscillating water column system and an oscillating buoy system. The oscillating water column system is mainly composed of a air chamber 3, a turbogenerator 4 and an inner supporting cylinder 10. The oscillating buoy system is mainly composed of an oscillating buoy 5, a damping generator 6 and a pile foundation structure 8.

For the oscillating water column system, the air chamber 3 is composed of a cylindrical ring body 1 and a hemispherical ring body 2; the hemispherical ring body 2 is positioned on the cylindrical ring body 1 and has the same radius as the cylindrical ring body 1. A air hole pipeline is arranged on the upper part of the hemispherical ring body 2; and the air hole pipeline is connected with the turbogenerator 4 which rotates in the same direction under the action of bidirectional airflows. The upper part of the inner supporting cylinder is provided with a supporting truncated cone 9 used for supporting the air chamber 3. Four cylindrical air holes are formed in the supporting truncated cone 9, so that a compressed airflow enters the air hole pipeline. For the oscillating buoy system, the lower part of the inner supporting cylinder 10 is fixedly connected with the oscillating buoy 5. A damping generator 6 is arranged in the lower air cylinder 11 of the oscillating buoy 5. The piston 7 is fixedly connected to the pile foundation structure 8.

During use, for the oscillating water column system, a water surface in the cylindrical ring body 1, the cylindrical ring body 1 and the hemispherical ring body 2 jointly form the air chamber 3. Under the action of waves, the waves penetrate through the bottom of the cylindrical ring body 1 to enter the cylindrical ring body 1 to form a water column which oscillates up and down; and the water column vibrates up and down to compress and expand the air in the air chamber 3 so as to push the turbogenerator 4 repeatedly through the air hole pipeline on the top of the air chamber 3 to rotate. The water column in the air chamber 3 has a fixed fluctuation frequency. An appropriate size of the air chamber 3 is selected so that the oscillation frequency of the water surface in the air chamber is close to the frequency of outside waves. The fluctuation range of the resonant water surface may be much higher than the range of the waves, so that the flow velocity and the flow of the air is greatly enhanced, thereby enhancing system efficiency.

For the oscillating buoy system, the piston 7 and the pile foundation structure 8 are fixedly connected together. The damping generator 6 is respectively connected with the piston 7 and the oscillating buoy 5. The oscillating buoy 5 produces vertical motion under the action of the waves. Relative displacement is produced between the piston 7 and the oscillating buoy 5, so as to force the damping generator 6 to apply work. Two systems can be respectively subjected to wave energy conversion in respective spectral ranges without affecting each other. When incident waves are large, the oscillating buoy produces vertical motion and at this moment, the oscillating buoy system mainly generates electricity. When the incident waves are small, the oscillating buoy does not move and at this moment, the oscillating water column wave energy conversion is mainly conducted.

The cylindrical ring body 1 adopts a circular structure, is free from the effect of external wave directions, and can adapt to various wave directions.

The hemispherical ring body 2 is used at the top of the air chamber 3. The air enters the air hole pipeline via the hemispherical ring body 2, which can effectively reduce resistance, increase the airflow velocity and increase the efficiency of wave energy conversion.

The turbogenerator 4 which can rotate in the same direction under the action of bidirectional airflows is used. When the air enters and is exhausted from the air chamber, electricity can be generated, thereby enhancing the generating efficiency.

The inner supporting cylinder 10 is arranged on the central axis of the cylindrical ring body 1, which can effectively reduce the shake of the water surface in the air chamber.

The supporting truncated cone 9 adopts a circular structure, can keep the same stress state under the effect of the waves in different directions, and enhances structural reliability.

The oscillating buoy 5 adopts a cylindrical structural form, and the upper and the lower round edges of the oscillating buoy 5 are smoothed to reduce the horizontal acting force of waves.

A seal ring is arranged between the piston 7 and the air cylinder 11, to prevent the damping generator from being corroded due to water inflow in the air cylinder 11 or prevent silt from entering the damping generator.

Besides the above embodiments, the present invention can also have other embodiments. Technical solutions formed by adopting equivalent replacement or equivalent transformation shall be included in the protection scope claimed in the present invention.

We claim:

1. An oscillating water column-oscillating buoy combined wave energy converter, the wave energy, converter comprising:
    an oscillating water column system and an oscillating buoy system;
    wherein the oscillating water column system comprises an air chamber, a turbogenerator and an inner supporting cylinder; and the oscillating buoy system comprises an oscillating buoy, a damping generator and a pile foundation structure;
    wherein the oscillating water column system is connected with the oscillating buoy system through the inner supporting cylinder and the oscillating buoy; and the pile foundation structure is used to fix the entire converter to a seabed;
    wherein the air chamber is a cavity composed of a cylindrical ring body and a hemispherical ring body; the hemispherical ring body is upturned on the upper end of the cylindrical ring body and has the same radius as the cylindrical ring body; the cylindrical ring body is a hollow cylinder with open top and bottom; the hemispherical ring body is a hollow hemispheroid; an air hole pipeline is arranged in the center position of the top of the hemispherical ring body; the turbogenerator is positioned in the air hole pipeline; the air hole pipeline is provided with a baffle plate;
    wherein the inner supporting cylinder is positioned on an axis of the air chamber, and the top of the inner supporting cylinder is connected with the hemispherical ring body through a supporting truncated cone; the top of the supporting truncated cone is attached to an inner surface of the hemispherical ring body and is used for supporting the air chamber; the top center of the supporting truncated cone is provided with an air hole pipeline which is communicating with the air hole pipeline on the hemispherical ring body; four cylindrical air holes which penetrate through the truncated cone are uniformly formed in the supporting truncated cone, and are communicating with the air hole pipeline in the top center of the supporting truncated cone so that a compressed airflow enters the air hole pipeline; and
    wherein the oscillating buoy is a cylinder with a cavity on the bottom to produce buoyancy, and has an air cylinder on the lower part; the top of the oscillating buoy is fixedly connected with the bottom of the inner supporting cylinder; the damping generator and a piston are positioned in the cavity; the upper part of the damping generator is connected with the inner wall of the cavity of the oscillating buoy, and the lower part is connected with the piston; and the piston is fixedly connected with the pile foundation structure through the air cylinder.

2. The oscillating water column-oscillating buoy combined wave energy converter according to claim 1, wherein the cylindrical ring body, the hemispherical ring body and the air hole pipeline are made of high-strength light materials; and joints are anchored with high-strength stainless steel bolts.

3. The oscillating water column-oscillating buoy combined wave energy converter according to claim 1, wherein the turbogenerator rotates under effect of bidirectional airflows in a direction of the bidirectional flow.

4. The oscillating water column-oscillating buoy combined wave energy converter according to claim 1, wherein upper and lower round edges of the oscillating buoy are smoothed to reduce horizontal force of waves on the entire converter.

5. The oscillating water column-oscillating buoy combined wave energy converter according to claim 3, wherein upper and lower round edges of the oscillating buoy are smoothed to reduce horizontal force of waves on the entire converter.

6. The oscillating water column-oscillating buoy combined wave energy converter according to claim 1, wherein the piston and the air cylinder are sealed with a seal ring.

7. The oscillating water column-oscillating buoy combined wave energy converter according to claim 3, wherein the piston and the air cylinder are sealed with a seal ring.

8. The oscillating water column-oscillating buoy combined wave energy converter according to claim 4, wherein the piston and the air cylinder are sealed with a seal ring.

* * * * *